US007127534B2

United States Patent
Jackson et al.

(10) Patent No.: US 7,127,534 B2
(45) Date of Patent: Oct. 24, 2006

(54) READ/WRITE COMMAND BUFFER POOL RESOURCE MANAGEMENT USING READ-PATH PREDICTION OF FUTURE RESOURCES

(75) Inventors: Thomas Patrick Jackson, Costa Mesa, CA (US); Curtis Edward Nottberg, Costa Mesa, CA (US); David Robert Wiley, Costa Mesa, CA (US); Marc Timothy Jones, Costa Mesa, CA (US)

(73) Assignee: Emulex Design & Manufacturing Corporation, Costa Mesa, CA (US)

( * ) Notice: Subject to any disclaimer, the term of this patent is extended or adjusted under 35 U.S.C. 154(b) by 77 days.

(21) Appl. No.: 10/609,291

(22) Filed: Jun. 27, 2003

(65) Prior Publication Data
US 2004/0267982 A1 Dec. 30, 2004

(51) Int. Cl.
*G06F 3/00* (2006.01)
(52) U.S. Cl. .............................. 710/52; 710/27; 710/29
(58) Field of Classification Search .................. 710/29, 710/57, 52, 27; 709/226
See application file for complete search history.

(56) References Cited

U.S. PATENT DOCUMENTS 5,247,616 A * 9/1993 Berggren et al. ........... 709/212
5,584,039 A * 12/1996 Johnson et al. ................. 710/6
5,852,718 A * 12/1998 Van Loo ..................... 709/208
6,263,411 B1 * 7/2001 Kamel et al. ............... 711/167
6,714,553 B1 * 3/2004 Poole et al. ................. 370/412
2003/0046396 A1 * 3/2003 Richter et al. ............... 709/226

* cited by examiner

*Primary Examiner*—Fritz Fleming
*Assistant Examiner*—Harold Kim
(74) *Attorney, Agent, or Firm*—Morrison & Foester LLP

(57) ABSTRACT

A method for managing read and write data congestion in a system for executing write and read data commands and having a buffer pool of blocks for temporarily storing read and write data is disclosed. Management of the buffer pool and the initiation of read and write commands ensures that free blocks are available to temporarily store read data arriving at a host bus adapter (HBA). If the currently available blocks would be substantially consumed by the total outstanding inbound read data requested, no more write data commands will be initiated. As inbound read data is received into the buffer pool and subsequently transferred out of the buffer pool to the initiator device, the blocks in the buffer pool are freed up. When the read data transfer is completed and sufficient buffer resources have been freed up, read and write data commands may resume.

26 Claims, 9 Drawing Sheets ated into TCP/IP packets. The HBA 100 will extract the SCSI infor-

READ/WRITE COMMAND BUFFER POOL RESOURCE MANAGEMENT USING READ-PATH PREDICTION OF FUTURE RESOURCES

BACKGROUND OF THE INVENTION

1. Field of the Invention

The present invention relates, generally, to the management of memory required to facilitate the execution of read/write commands in host bus adapter (HBA) cards and, in one embodiment, to an apparatus and method for managing read/write command data congestion at the application layer to improve performance and reduce the occurrence of resource exhaustion that results in lost packet data at the transport layer.

2. Description of Related Art

HBAs are input/output (I/O) adapters that connect a host computer's bus and an outside network such as the Internet or a Fibre Channel loop. HBAs manage the transfer of information between the bus and the outside network. HBAs are typically implemented in circuit cards that can be plugged into the backplane of the host computer. For example, as illustrated in FIG. 1, a HBA 100 can be inserted into a connector 102 which interfaces to the Peripheral Component Interconnect (PCI) bus 104 of a host computer 106 to enable devices connected to the PCI bus 104 to communicate with devices in a storage area network (SAN) 108 using, for example, fibre channel or Internet Small Computer System Interface (iSCSI) protocols.

Within the host computer 106 is a SCSI driver 110 which, upon initialization, enumerates all SCSI devices attached to the PCI bus 104. If the HBA 100 is an iSCSI HBA, then the HBA 100 will appear to be a SCSI device in the list of one or more SCSI devices enumerated by the SCSI driver 110. The HBA contains components such as a microprocessor 114, memory 116, and firmware 118. Also within the host computer 106 is an iSCSI driver 112 that locates SCSI devices in the SAN 108. The located SCSI devices are presented to the PCI bus 104 through the HBA 100 as if they were locally attached to the PCI bus 104.

Once initialization and identification of the SCSI devices is complete, iSCSI commands, formatted into protocol data units (PDUs), may be communicated between devices connected to the PCI bus 104 and SCSI devices in the SAN 108. iSCSI commands, as defined herein, are Transmission Control Protocol/Internet Protocol (TCP/IP) packets traveling in both directions containing SCSI data and commands encapsulated in a TCP/IP frame, but may also include iSCSI logging sequences (control) and asynchronous control messages between an initiator device and a target device. Examples of iSCSI commands that would be included in a packet are a request to enumerate the devices that a particular target is controlling, a request to abort a command in progress, or a logoff request.

As noted above, in order to facilitate the communication of iSCSI protocols over the SAN 108, the iSCSI commands must be encapsulated into TCP/IP packets. For example, when an iSCSI command tagged with a particular target SCSI device is presented to the HBA 100, the iSCSI command is first encoded into TCP/IP packets, which are then sent to the target device. The target will extract the SCSI information out of the TCP/IP packets and reconstruct the PDUs. The target SCSI device may also send a response back to the HBA 100 which will be encapsulated into TCP/IP packets. The HBA 100 will extract the SCSI information out of the TCP/IP packets and send it back to the initiator device on the local PCI bus 104.

FIG. 2 illustrates a protocol stack 202 in HBA 200 according to the Open Systems Interconnection (OSI) model for networking. Firmware in the HBA may control the functions of the protocol stack. There are a total of seven layers in the OSI model. The bottom physical layer or Media Access Control (MAC) layer 204 communicates with a similar protocol stack 206 in a device 208 in a SAN. Above the MAC 204 is the link layer 210. The top layer is the application layer 212, which uses an interface to the stack called a socket, and thus it can be considered a socket layer. Data or commands can be sent or received through the application layer 212. For example, a write command and its associated data can be sent using a socket call, which (conceptually) filters down through the stack 202, over a wire or other link 216 to a similar stack 206 in a target device 208. The target device 208 can also send a response socket call back to the initiator which travels across the wire 216 and back up through the stack 202 to the application layer 212, which communicates with the PCI bus.

If an iSCSI write command is to be communicated to a target device, a SCSI driver first formats the write command. As illustrated in FIG. 3, within the formatted write command is a scatter gather list 300, which is comprised of a list of scatter gather elements 302, each of which includes an address field for identifying the location of data to be written, a length field indicating the amount of data at that location, and an optional pointer to another scatter gather element. The scatter gather list 300 enables write data for a particular write command to be stored in separate locations.

Referring now to FIG. 4, when a write command is processed, the write data from the initiator device is retrieved using the address fields in the scatter gather list and stored into one or more buffers or blocks within a limited-size buffer pool 412, which is part of the memory of the HBA. The limited-size buffer pool may be a fixed-size buffer pool, or it may be of a configurable size but nevertheless not easily expandable as memory needs dictate. The buffer pool 412 is comprised of a number of buffers or blocks (e.g. 4 kB) that are typically of fixed size. The buffer pool 412 is managed by the stack (see FIG. 2), and is accessible from the stack.

When write data is stored in blocks in the buffer pool 412, pointers to those blocks called local descriptors 404 are stored in sequence in a transmit (Tx) list 400. Each local descriptor points to only one block, and a link in the descriptor identifies how much of that block is filled with valid data. At the end of the Tx list is a "stop" marker, which indicates the end of the Tx list. Thus, the number of local descriptors and the links in the Tx list are an indication of how much of the buffer pool is occupied by write data.

When the write command is ready to be transmitted to the target, the local descriptors 404 in the Tx list 400 are asynchronously processed in sequence. As each local descriptor 404 is processed, the data stored in the block identified by the local descriptor 404 is formatted into TCP/IP packets. The target address information must also be placed into the TCP/IP wrapper so that the target device will recognize itself as the intended target. The formatted write data is then sent into the protocol stack and out over the network, and the local descriptor that pointed to the block of write data is removed from the Tx list 400. When the last descriptor is reached, this process is stopped. When the write operation is complete, the target device will send an acknowledgement response back to the initiator device, indicating that the write command has been completed.

If an iSCSI read command is to be communicated to a target device, an SCSI driver first formats the read command. The read command includes a scatter gather list, whose address fields identify locations in the initiator device at which the read data will be stored. When a read command is received at the HBA, the read command is encapsulated into TCP/IP packets, which then conceptually filter down through the stack and are transmitted across a wire to the target. The target then locates the data, encapsulates it, and send it back to the HBA.

When read data is received from the target, the HBA uses the Rx list 402 to determine where to store the read data. The Rx list 402 contains local descriptors 406 that normally point to free blocks in the buffer pool 412. As the read data is received into the HBA, the read data is stored into free blocks in the buffer pool 412 identified by the local descriptors 406 in the Rx list 402, and the status of the local descriptors is changed to indicate that the local descriptors are now pointing to filled blocks.

In some implementations, once all the read data has been stored in the buffer pool 412, the read data can be transferred to memory using direct memory addressing (DMA) in accordance with the address locations in the read command scatter gather list. As read data is transferred out of the buffer pool 412, the buffers in the buffer pool are freed up and the local descriptors in the Rx list 402 that previously pointed to the read data are now re-designated as pointing to free blocks. Alternatively, as read data arrives and is stored in the buffer pool 412, look-ahead DMA may be performed to move the data to destinations specified by the scatter gather list in advance of the receipt of all read data.

Note, however, that if the reading of data from the target is initiated but there are insufficient local descriptors in the Rx list pointing to free blocks to accommodate the read data, the MAC will discard any inbound read data.

In general, the movement of read or write data between host computer memory and the buffer pool may occur using DMA under the control of a specialized DMA processor that can take control of the PCI bus and move data across the PCI bus in the background without the participation of the host computer's main processor. In addition, multiple reads and writes may occur at the same time.

It should be understood that the Tx list 400 and the Rx list 402 may contain a fixed maximum number of entries (descriptors), e.g. 256. Because there may be more total blocks in the buffer pool 412 (e.g. 5000) than are identified in the entries in the Rx and Tx lists, a "free" list of descriptors 414 is also maintained within the HBA memory that keeps track of free blocks not identified in the Tx and Rx lists.

As illustrated in FIG. 4, the MAC manages two lists, a transmit (Tx) list 400 and a receive (Rx) list 402. In one example, 32 MB of memory may be available in the HBA, and of those 32 MB, 19 MB may available for the buffer pool. The other 13 MB are reserved for other functions, including the Tx and Rx lists. Firmware in the HBA controls the Rx and Tx lists and the buffer pool. In general, the SCSI driver makes read or write commands available on the PCI bus and signals the HBA, which then controls the Tx and Rx lists and the filling and emptying of the buffers while the host computer is passive.

In the conventional architecture described above, if a large portion of the buffer pool in the HBA was utilized to temporarily store outbound write data and received read data, and there were insufficient free blocks to store further incoming read data, inbound data packets would have been dropped. Furthermore, because TCP/IP provides a mechanism for counting packet headers received from the target during the transmission of command or data packets, if the target detected that the count did not conform to expectations then a retransmission would be initiated, which would create further slowdowns. Moreover, if certain packets in a sequence were not transmitted, the entire transmission may be delayed until the missing packet is successfully retransmitted. The loss of inbound read data packets therefore results in time-outs and retransmissions by the target device, which can severely degrade throughput performance.

In addition, if the above-described shortage of blocks in the buffer pool occurs, causing read data congestion and the incomplete processing of read commands, and nevertheless the HBA continues to receive and initiate new write commands, any remaining free blocks in the buffer pool could be consumed by write data. However, because the pending read commands do not have sufficient buffers for completion, they cannot be completed. Without completion of the pending read commands, the new write commands cannot be processed. In such a situation, the remaining free blocks in the buffer pool are being used for write commands that couldn't possibly succeed. If this should happen, then subsequent retransmissions of read data by the target would also be doomed to failure, because there would be no free blocks available to receive it. This lockup condition would persist until the target terminated its retransmissions, closed the connection, and started over. Therefore, a performance problem (degradation) could turn into a functional problem (lockup) if the bottleneck became severe enough.

To overcome these problems and minimize the chance of performance degradation or lockup, in some previous designs the buffer pool is split in half, with one half of the buffer pool reserved for transmit (write) data, and the other for receive (read) data. This structure is easier to manage, but more wasteful and inefficient, especially if the buffer pool usages are unequal. With split buffer pools, if the transmit path, for example, needed more memory, it couldn't use the memory for the receive path, even if that memory were unused.

Thus, a need exists for an apparatus and method that manages read/write command data congestion at the application layer to improve performance and reduce the resource exhaustion that results in lost packet data at the transport layer.

SUMMARY OF THE INVENTION

Embodiments of the present invention manage the buffer pool and the execution of read and write commands using the protocol stack in the HBA to ensure that free blocks are available to temporarily store read data arriving at the HBA. The management of read/write command data congestion at the application layer of the protocol stack improves performance and reduces resource exhaustion that can result in lost packet data at the transport layer. To reduce the amount of read data retransmissions, write data transmissions may be throttled based upon the amount of read data requests that are currently unsatisfied. If the currently available blocks would be substantially consumed by the total outstanding inbound read data requested, no more write data command PDUs will be transmitted by the application layer. The calculation of anticipated buffer pool resources needed for inbound read data includes an expected response PDU as well as the expected data size. Because outbound write data is also temporarily stored in blocks in the buffer pool, the consumption of blocks for outbound write data affects the number of currently available blocks in the buffer pool.

When the throttled condition exists, no read or write command PDUs are generated until sufficient buffer resources become available. As inbound read data is received into allocated buffers and transferred to the initiator device, the blocks in the buffer pool are freed up. When the read data transfer is completed and sufficient buffer resources have been freed up, read and write command PDU transmission may resume.

DETAILED DESCRIPTION OF PREFERRED EMBODIMENTS

Figure 1:
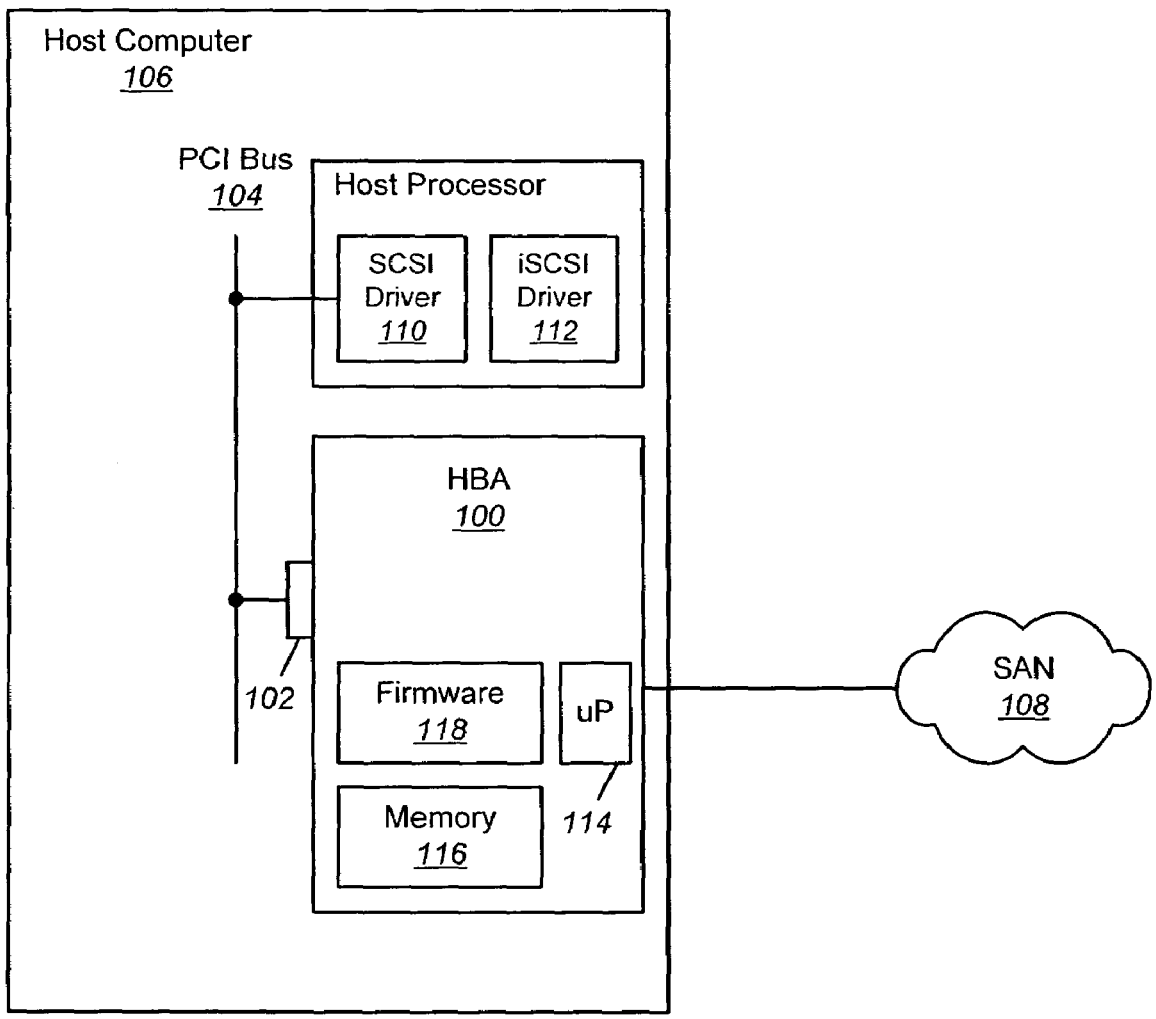
FIG. 1 is an exemplary block diagram illustrating a system environment comprising a host computer coupled to a storage area network via a host bus adapter.
Figure 2:
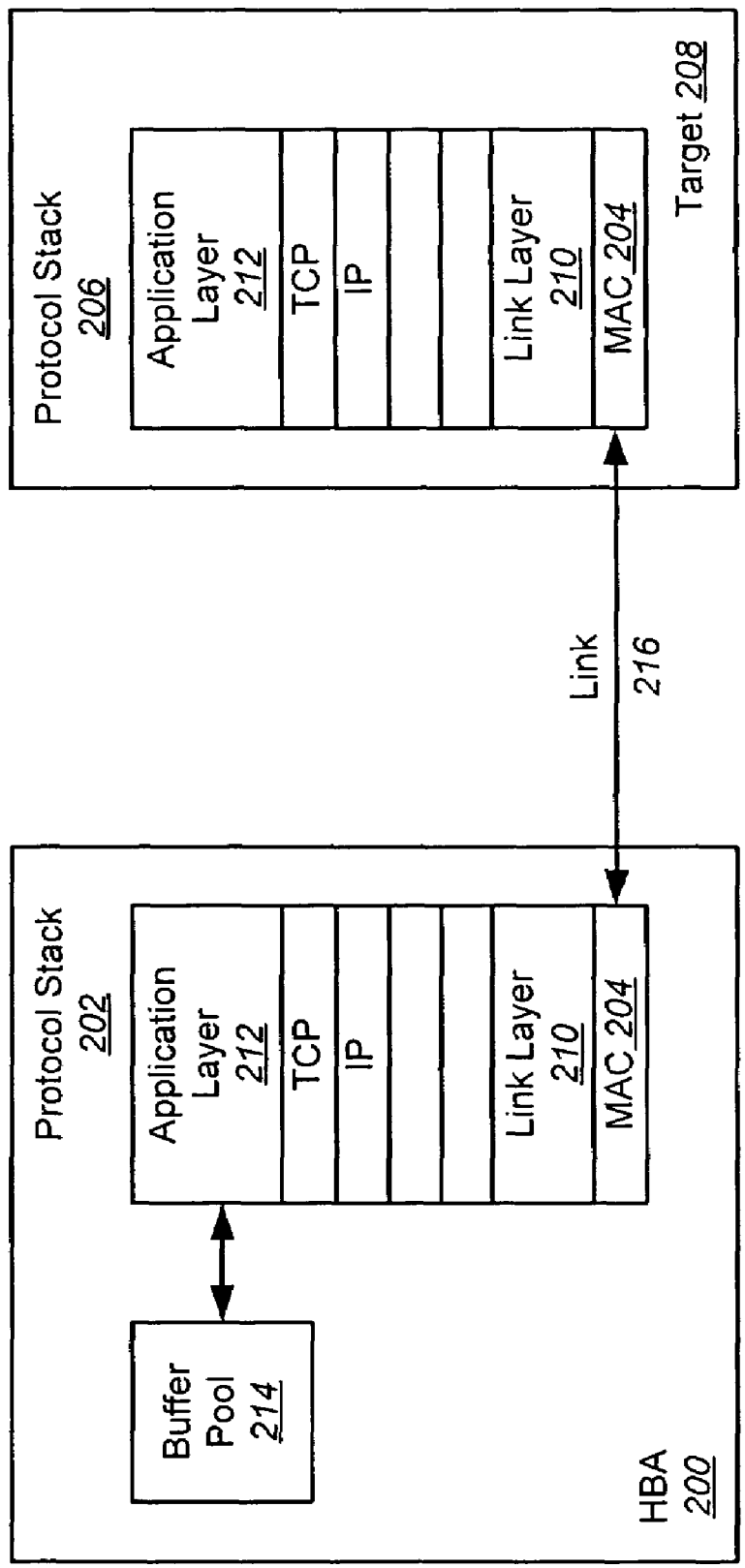
FIG. 2 is an exemplary block diagram illustrating a protocol stack in a HBA according to the Open Systems Interconnection (OSI) model for networking.
Figure 3:
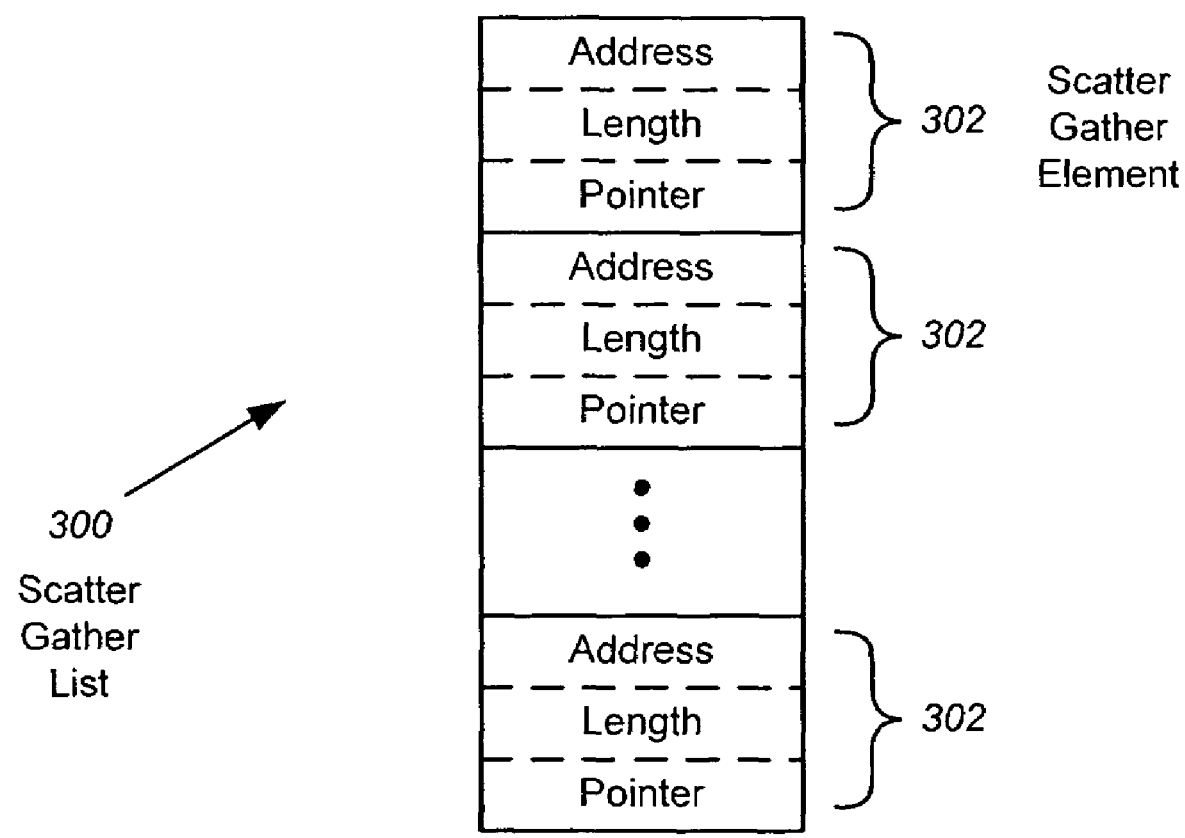
FIG. 3 is an exemplary block diagram illustrating a scatter gather list comprised of scatter gather elements within a read or write command.
Figure 4:
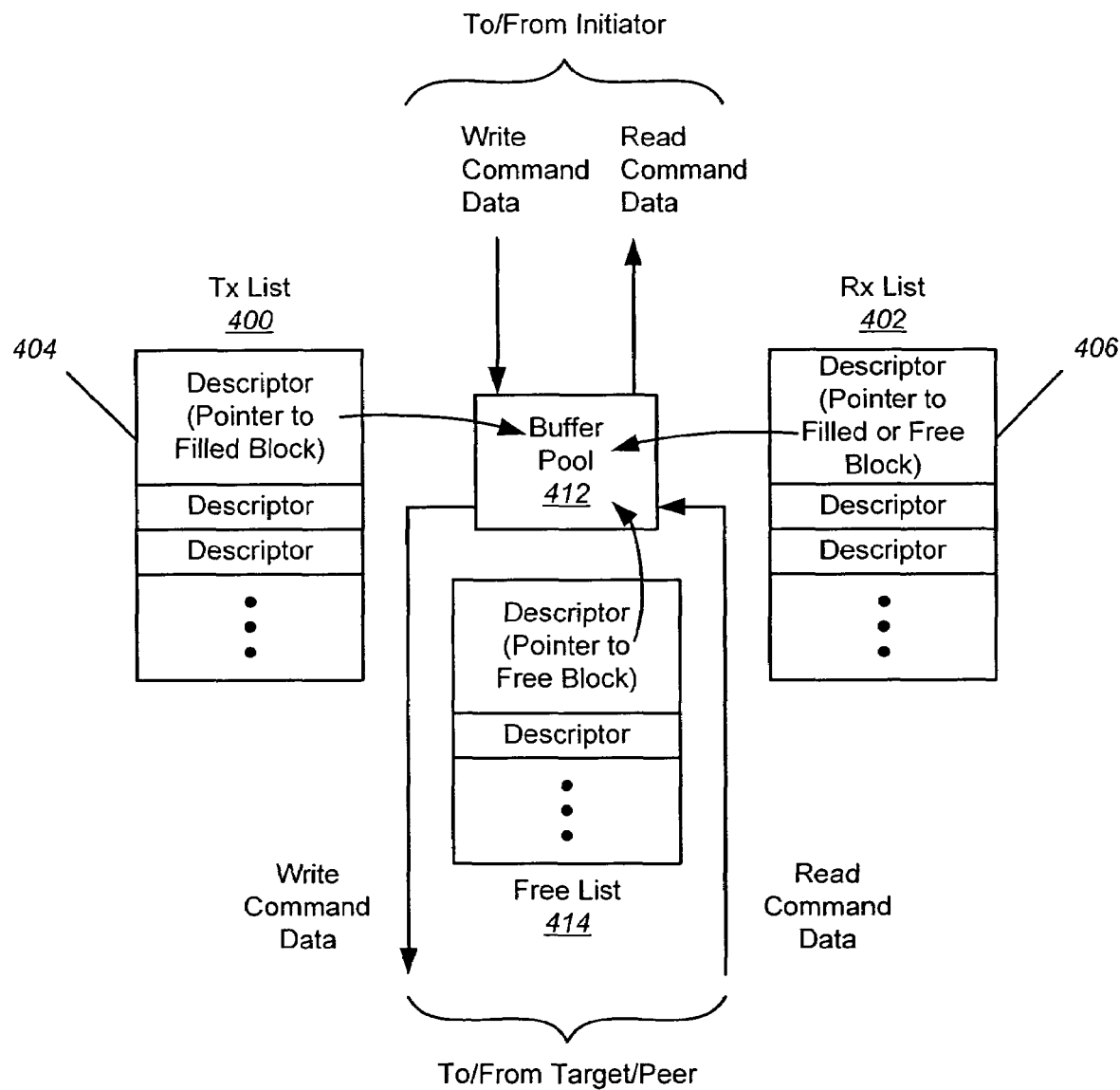
FIG. 4 is an exemplary block diagram illustrating a transmit list, receive list, and free list managed by the media access control layer of a protocol stack in a HBA.

In the following description of preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the preferred embodiments of the present invention.

It should also be noted that although the present invention is primarily described herein in terms of iSCSI HBAs for purposes of illustration and discussion only, embodiments of the present invention are applicable to other upper layer protocols (ULPs) where read requests can be associated to available resources in order to provide increased performance, and in particular to store-forward systems with a fixed or limited size buffer pool shared between the transmit and receive paths in which data needs to be temporarily stored in the HBA before it is forwarded to the destination.

When write data to be transmitted to a target device arrives at an HBA from an initiator device attached to a host computer, or when read data to be transmitted to an initiator device arrives at the HBA from a target device, before it is sent to its destination it must first be placed in blocks in a shared fixed or limited-size buffer pool in memory within the HBA. The buffer pool is shared between the read and write data paths to avoid the inefficiencies caused by memory fragmentation. The total available memory on the HBA (e.g. 32 MB) is divided into buffers or blocks that may be of fixed size (e.g. 4 kB). Entire blocks are allocated or freed as needed. The HBA itself needs a certain amount of memory for its operations (e.g. 13 MB), leaving the remainder of the memory (e.g. 19 MB) available for the buffer pool.

If an insufficient number of blocks are available to store read or write data packets, those packets are lost. The loss of read packets will typically result in retransmissions by the target device, which degrade system throughput. In addition, mismanagement of incoming write data requests can further degrade system throughput and even cause lockup.

Embodiments of the present invention manage the buffer pool and the execution of read and write commands using the protocol stack in the HBA to ensure that free blocks are available to temporarily store read or write data arriving at the HBA. The management of read/write command data congestion at the application layer of the protocol stack improves performance and reduces resource exhaustion that can result in lost packet data at the transport layer. To reduce the amount of read data re-transmissions, read and write command PDU transmissions may be throttled based upon the amount of read data requests that are currently unsatisfied. If the currently available blocks would be substantially consumed by the total outstanding inbound read data requested, no more read or write command PDUs will be transmitted by the application layer. The calculation of anticipated buffer pool resources needed for inbound read data includes an expected response PDU as well as the expected data size.

Because outbound write data is also temporarily stored in blocks in the buffer pool, the consumption of blocks for outbound write data affects the number of currently available blocks in the buffer pool. When the throttled condition exists, no write data command PDUs are generated until sufficient buffer resources become available. As inbound read data is received into allocated buffers and transferred to the initiator device, the blocks in the buffer pool are freed up. When the read data transfer is completed and sufficient buffer resources have been freed up, write data command PDU transmission may resume.

In other words, recognizing that HBA memory is shared between the read and write paths, embodiments of the present invention avoid processing too many new read or write commands for the available memory, taking into account the memory that will be needed for read data being returned from the target due to pending read data requests. When faced with a new read or write command, embodiments of the present invention count the memory space available for the expected results of that command before deciding to process it. In essence, embodiments of the present invention implement capacity-based processing of write and read commands by preventing the initiation of new read or write commands until pending commands have been processed enough to free up sufficient memory in the buffer pool. The HBA does not initiate any new work (in the form of read or write commands) until sufficient memory has been freed up not only to complete the new work, but also to finish the work that has already been started.

Figure 5:
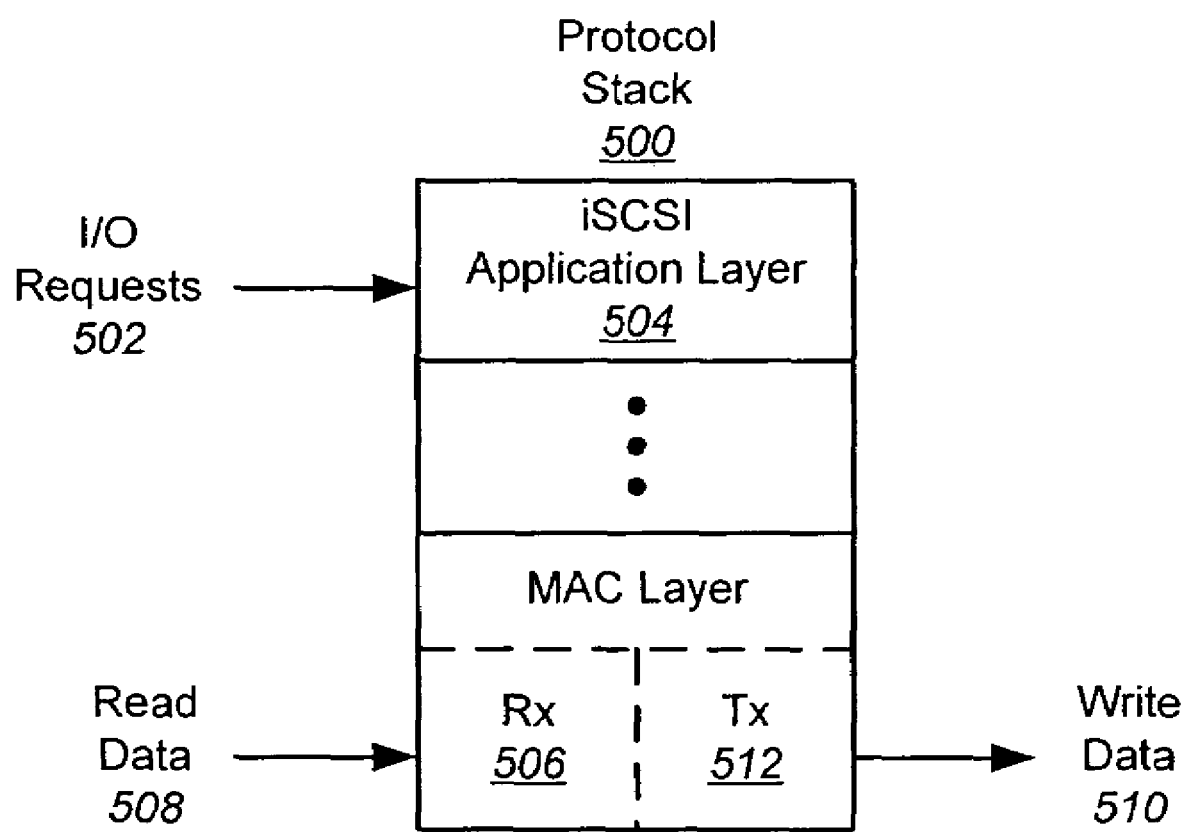
FIG. 5 is an exemplary illustration of a protocol stack for processing read and write commands in accordance with monitored buffer pool resources according to embodiments of the present invention.

FIG. 5 is an exemplary illustration of a protocol stack 500 for processing read and write commands in accordance with monitored buffer pool resources according to embodiments of the present invention. FIG. 5 shows read and write requests (commands) 502 to be initiated being received by the application layer 504 in the protocol stack 500 of an HBA. As pending (already initiated) read requests are processed, the amount of buffer pool resources allocated to satisfy these pending read requests and the amount of available buffer pool resources are monitored. If the next write request to be initiated will exceed the available resources (or will leave an insufficient margin), all further write requests are held (throttled). Because of this preprocessing verification, when the MAC Rx layer 506 receives read data 508 from in-progress (pending) read requests, buffer pool resources should be available. As inbound read data 508 is processed, buffer pool resources are freed up and the amount of available buffer pool resources is updated. If sufficient buffer resources have been freed up, these newly available resources will allow throttled write requests to be initiated for transmitting write data 510 to the target.

Similarly, if the number of blocks needed to store read data associated with the next read request to be initiated will exceed the available resources (or will leave an insufficient margin), all further read requests are held (throttled) while pending read requests are processed to completion in order to free up buffer pool resources. As inbound read data 508 is processed, buffer pool resources are freed up and the amount of available buffer pool resources is updated. If sufficient buffer resources have been freed up, these newly available resources will allow throttled read requests to be initiated for receiving read data 508 from the target.

Figure 6:
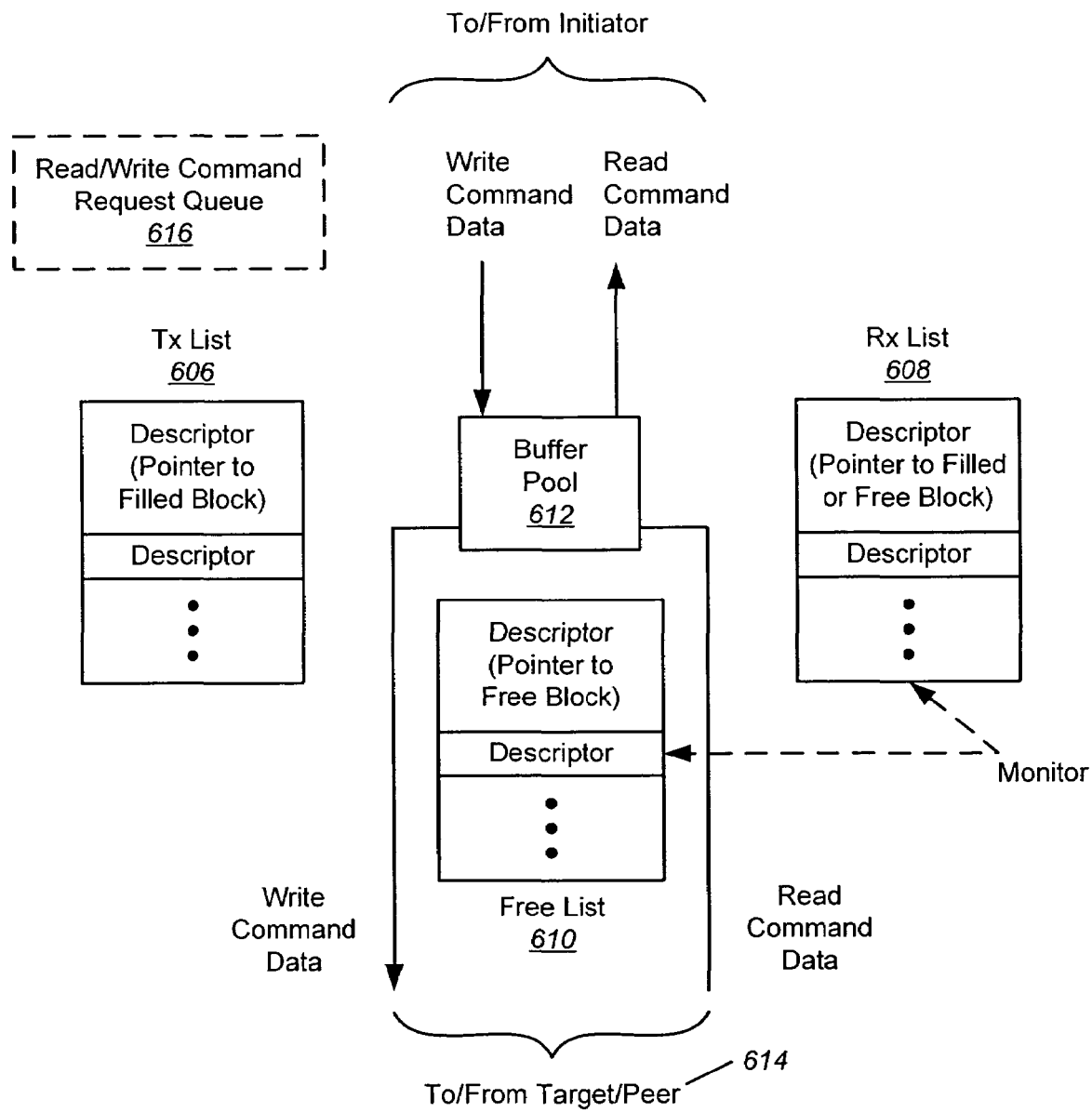
FIG. 6 is an exemplary block diagram illustrating a HBA containing a Tx list, Rx list, free list, and a buffer pool under the control of the application layer in a protocol stack within the HBA for processing read and write commands in accordance with monitored buffer pool resources according to embodiments of the present invention.

FIG. 6 is an exemplary illustration of an HBA 600 containing a Tx list 606, Rx list 608, free list 610, and buffer pool 612 under the control of the application layer in a protocol stack within the HBA 600 for processing read and write commands in accordance with monitored buffer pool resources according to embodiments of the present invention.

The application layer monitors the number of free blocks in the buffer pool 612 available for receiving read data by adding the number of descriptors in the Rx list 608 that point to free blocks and the number of descriptors in the free list 610. The sum represents the total number of free blocks in the buffer pool 612.

In a preferred embodiment of the present invention, the application layer also monitors the number of pending read data requests, and determines how many free blocks will be needed to receive the read data for the pending read data requests. Pending read data requests are those read data requests that have been sent to the target, but have not yet had read data transmitted back to the HBA 600 by the target 614. Based on the command size of the pending read data requests, a certain amount of read data can be expected to be transmitted back to the HBA 600. For example, if the command size of a pending read data request indicates a read of 64 kB, 16 4 kB blocks will be needed to store the read data.

If a new write data request is received, the application layer determines how many free blocks will be needed to temporarily store the write data for the new write data request. If there are sufficient free blocks in the buffer pool to receive all of the write data for the new write data request, then the new write data request can be initiated. The write data will be loaded into the free blocks in the buffer pool, and descriptors pointing to the filled blocks will be added to the Tx list 606. The write data will then be transmitted to the target.

However, if there are insufficient free blocks in the buffer pool 612 to receive all of the write data for the new write data request, then that write data request is throttled and placed in a first-in-first-out (FIFO) read/write command request queue 616, and no further write data requests will be initiated until sufficient read data requests have been completed and sufficient free blocks have been made available to receive all of the write data for the new write data request. Subsequent new write data requests received during this throttled time will also be queued into the read/write command request queue 616. Note that although no further write data requests will be initiated during this time, pending write data requests (write data requests that have already been initiated) will continue to completion.

As pending read data requests are processed and inbound read data is received into the buffer pool 612 and then transferred out of the buffer pool, buffer pool resources are freed up and the amount of available buffer pool resources is updated. If there are sufficient free blocks in the buffer pool to receive all of the write data for the next write data request to be initiated from the read/write command request queue 616, then the next write data request can be initiated.

If a new read data request is received, the application layer determines how many free blocks will be needed to temporarily store the read data for the new read data request. If there are sufficient free blocks in the buffer pool 612 to receive all of the read data for the new read data request, then the new read data request can be initiated. When the read data is received from the target device 614, the HBA uses the Rx list 608 to determine where to store the read data. The Rx list 608 contains local descriptors that normally point to free blocks in the buffer pool 612. As the read data is received into the HBA, the read data is stored into free blocks in the buffer pool 612 identified by the local descriptors in the Rx list 608, and the status of the local descriptors is changed to indicate that the local descriptors are now pointing to filled blocks. The read data will then be transferred to the to the initiator device.

However, if there are insufficient free blocks in the buffer pool 612 to receive all of the read data for the new read data request, then that read data request is throttled and placed in a read/write command request queue 616, and no further read data requests will be initiated until sufficient read data requests have been completed and sufficient free blocks have been made available to receive all of the read data for the new read data request. Subsequent new read data requests received during this throttled time will also be queued into the read/write command request queue 616. Note that although no further read data requests will be initiated during this time, pending read data requests (read data requests that have already been initiated) will continue to completion.

As pending read data requests are processed and inbound read data is received into the buffer pool 612 and then transferred out of the buffer pool, buffer pool resources are freed up and the amount of available buffer pool resources is updated. If there are sufficient free blocks in the buffer pool to receive all of the read data for the next read data request to be initiated from the read/write command request queue 616, then the next read data request can be initiated.

Figure 7:
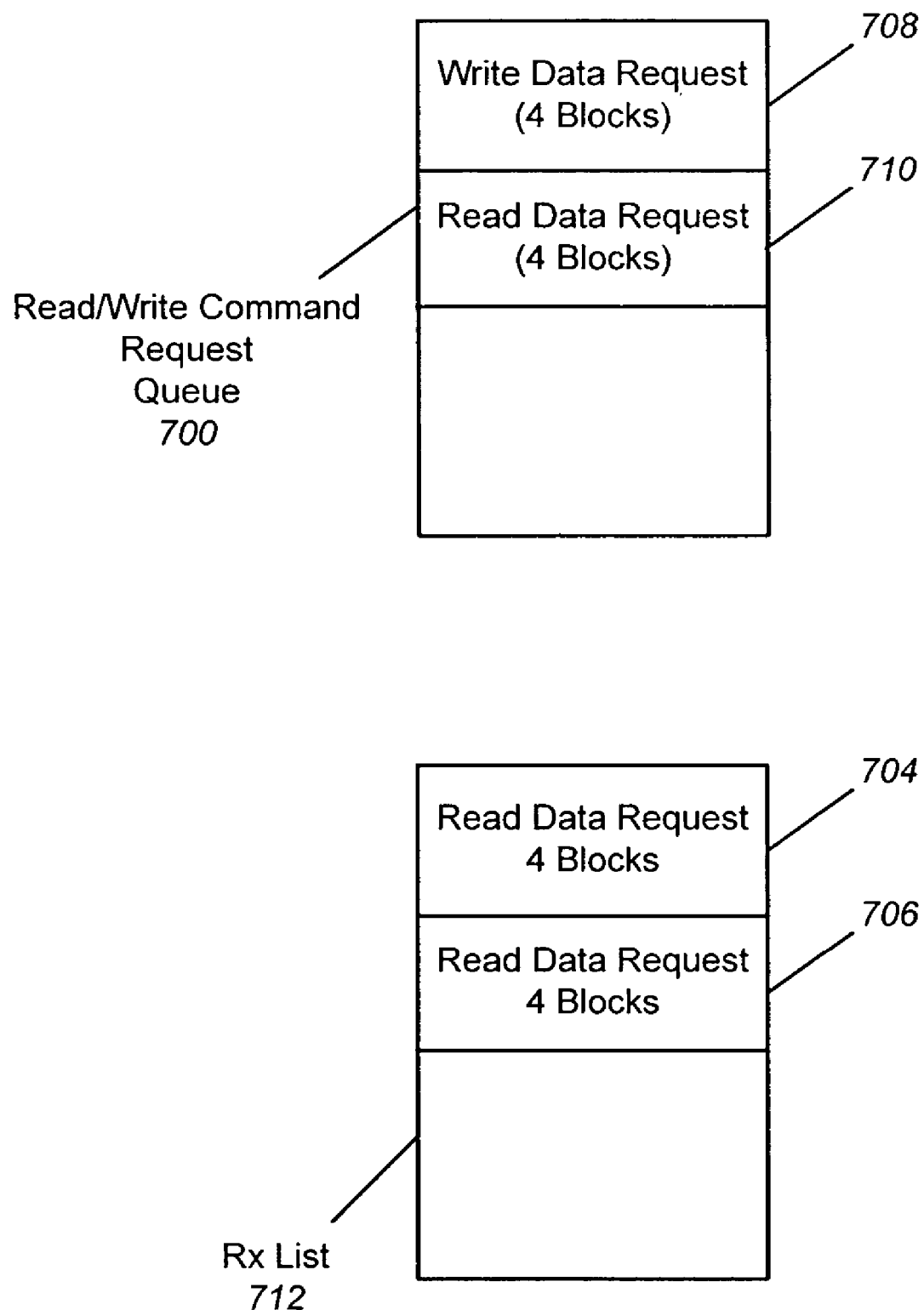
FIG. 7 illustrates an exemplary block diagram of a 10 buffer (block) buffer pool in a throttled state according to embodiments of the present invention.

FIG. 7 illustrates an exemplary block diagram of a 10 buffer (block) buffer pool in a throttled state according to embodiments of the present invention. Internal read/write command request queue 700 stores write and read requests that have been throttled. In the example of FIG. 7, the write and read data requests 708 and 710 have been throttled because two pending read data requests 704 and 706 have been initiated, each of which is predicted to consume five blocks (because a response PDU will consume one buffer in addition to the four buffers in the actual request). However, only 10 blocks are available, and thus the incoming read data from the target would occupy all 10 blocks, leaving no free blocks to store the eight blocks of data associated with the two throttled read and write data requests.

In one embodiment of the present invention, an internal counter is employed to determine the total estimated number of blocks required by all pending read data requests. Each time a read data request is initiated, the counter is incremented by the estimated number of blocks required to store the read data for that read data request. Each time a pending read request is completed, the counter is decremented by the number of blocks required to store the read data for that read data request. Thus, the state of the counter always represents the total estimated number of blocks required by all pending read data requests.

Unlike the preferred embodiments described above, in an alternative embodiment of the present invention, the memory needs of pending read requests is not considered. In this alternative embodiment, write data is stored into free blocks in the buffer pool only after the firmware has determined that there appear to be a sufficient number of free blocks in the buffer pool by counting the number of free blocks pointed to in the Tx list and the free list. If there are insufficient blocks to store the write data, the write data requests are throttled. Note that the anticipated memory needs of pending read data requests is not considered.

Figure 8:
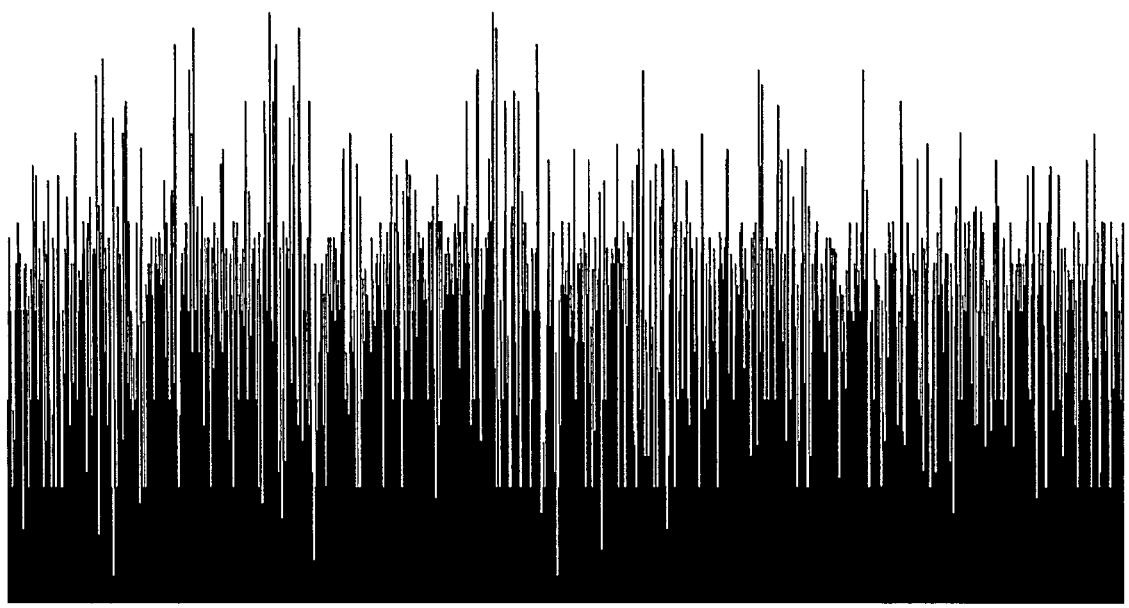
FIG. 8 illustrates an exemplary Ethernet plot of data throughput versus time without embodiments of the present invention.

FIG. 8 illustrates an exemplary Ethernet plot of data throughput versus time without the above-described alternative embodiment of the present invention. The y-axis represents the amount of data (e.g. packets or bytes) sent to and returned from the target, and each vertical line represents the amount of data sent to and returned from the target in a particular slice of time, which is variable depending on how much data is being displayed. The x-axis represents time.

The plot of FIG. 8 represents the throughput of HBAs without the alternative embodiment of the present invention. Nevertheless, the short vertical lines in FIG. 8 indicate the presence of time periods with a lack of incoming read data from the target. This may occur if the target has not been requested to send read data, or when the Rx list and free list do not contain sufficient free blocks to store incoming read data, thereby resulting in the loss of incoming data packets. When this occurs, the target will not receive an acknowledgement that the packets have been received, and may retransmit the read data, but FIG. 8 does not show retransmitted data in its throughput measurements. Another possible reason for a lack of incoming read data from the target is that if the amount of unacknowledged data exceeds a certain limit (e.g. 64 k), then the target will stop sending data to the HBA until sufficient acknowledgements have been received or the connection is terminated.

Figure 9:
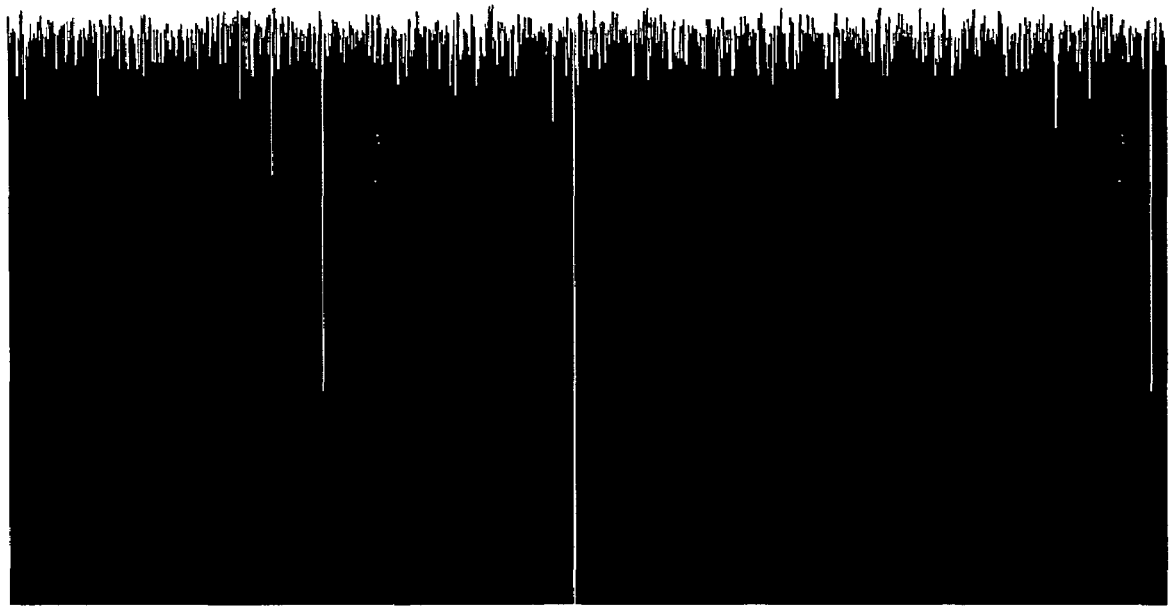
FIG. 9 illustrates an exemplary Ethernet plot of data throughput versus time in accordance with preferred embodiments of the present invention.

FIG. 9 illustrates an exemplary Ethernet plot of data throughput versus time in accordance with the above-described preferred embodiments of the present invention. FIG. 9 shows that with throttling, more data is able to be returned from the target, and therefore the throughput is much higher.

Embodiments of the present invention are generally applicable in ULP settings (e.g. iSCSI, fibre channel, or the like) where read requests can be associated with available resources in order to provide increased performance, and where the inbound path and outbound data paths share memory resources. Embodiments of the present invention are also generally applicable to store-forward technologies which first move data onto a card, then to the target, and vice versa.

Note that the above-described methods for determining the number of reserved and free buffers by monitoring the lists and buffers of FIG. 6 are only one example of managing read/write command data congestion at the application layer of the protocol stack to improve performance and reduce resource exhaustion. In other embodiments, other means such as counters, registers, and queues for keeping track of read/write commands and available memory may be employed. In addition, although in preferred embodiments firmware is employed to implement the invention, other means such as software, state machines and the like may also be used.

Although the present invention has been fully described in connection with embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. In a system for executing write and read data commands, an apparatus for managing read and write data congestion, the apparatus comprising:
   a shared read/write buffer pool of blocks for temporarily storing write data to be sent to a peer device and read data received from the peer device;
   a receive list memory which contains descriptor pointers to free blocks and blocks filled with read data in the shared read/write buffer pool;
   a transmit list memory which contains descriptor pointers to free blocks and blocks filled with write data in the shared read/write buffer pool; and
   a processor programmed for preventing an initiation of a new write data command until pending read data requests have been processed enough to free up sufficient blocks in the buffer pool to accommodate the data of the new write data command by
      determining a number of blocks in the shared read/write buffer pool that will be required to store the read or write data for the pending read data requests and the new write data command,
      determining a number of free blocks in the shared read/write buffer pool, and
      throttling the new write data command if the number of free blocks in the shared read/write buffer pool is insufficient to store the read data for the pending read data requests and the write data for the new write data command.

2. The apparatus as recited in claim 1, the system comprising a free list memory which contains descriptor pointers to free blocks not referenced in the receive list memory, the processor further programmed for determining the number of free blocks in the buffer pool by:
   summing the number of free blocks in the receive list memory and the free list memory.

3. The apparatus as recited in claim 1, the processor further programmed for initiating the new write data command if the number of free blocks is sufficient to store the read data for the pending read data requests and the write data for the new write data command.

4. The apparatus as recited in claim 1, the system comprising a free list memory which contains descriptor pointers to free blocks not referenced in the receive list memory, the processor further programmed for determining the number of free blocks in the buffer pool by:

summing the number of free blocks in the receive list memory and the free list memory; and subtracting from the sum a number of blocks estimated for storing incoming read data for any pending read data requests.

5. The apparatus as recited in claim 4, the processor further programmed for initiating the new read or write data command if the number of free blocks is sufficient to store the read data for the pending read data requests and the write data for the new write data command.

6. The apparatus as recited in claim 1, the processor further programmed for:
storing the throttled new write data command and any subsequent new read or write data commands into a first-in-first-out (FIFO) read/write command request queue;
processing pending read data requests to completion to free up blocks in the buffer pool; and
executing a next read or write data command from the read/write command request queue if the number of free blocks becomes sufficient to store the read or write data for the next read or write data command.

7. A host bus adapter (HBA) comprising the apparatus of claim 1, the HBA for implementing upper layer protocols (ULPs).

8. The HBA of claim 7, further comprising an Internet Small Computer System Interface (iSCSI) controller circuit.

9. A host computer comprising the HBA of claim 8.

10. A storage area network (SAN) comprising the host computer of claim 9, wherein an iSCSI network is coupled to the iSCSI controller circuit and one or more storage devices are coupled to the iSCSI network.

11. A computer program for avoiding read and write data congestion in a system for executing write and read data commands, the computer program being stored on a machine readable medium and executable to perform acts comprising:
temporarily storing write data to be sent to a peer device and read data received from the peer device in a shared read/write buffer pool of blocks;
storing descriptor pointers to free blocks and blocks filled with read data in the shared read/write buffer pool in a receive list memory;
storing descriptor pointers to free blocks and blocks filled with write data in the shared read/write buffer pool in a transmit list memory; and
preventing an initiation of a new write data command until pending read data requests have been processed enough to free up sufficient blocks in the buffer pool to accommodate the data of the new write data command by
determining a number of blocks in the shared read/write buffer pool that will be required to store the read or write data for the pending read data requests and the new write data command,
determining a number of free blocks in the shared read/write buffer pool, and
throttling the new write data command if the number of free blocks in the shared read/write buffer pool is insufficient to store the read data for the pending read data requests and the write data for the new write data command.

12. The computer program as recited in claim 11, the system comprising a free list memory which contains descriptor pointers to free blocks not referenced in the receive list memory, the computer program further executable to perform acts comprising determining the number of free blocks in the buffer pool by:
summing the number of free blocks in the receive list memory and the free list memory.

13. The computer program as recited in claim 11, further executable to perform acts comprising initiating the new write data command if the number of free blocks is sufficient to store the read data for the pending read data requests and the write data for the new write data command.

14. The computer program as recited in claim 11, the system comprising a free list memory which contains descriptor pointers to free blocks not referenced in the receive list memory, the computer program further executable to perform acts comprising determining the number of free blocks in the buffer pool by:
summing the number of free blocks in the receive list memory and the free list memory; and
subtracting from the sum a number of blocks estimated for storing incoming read data for any pending read data requests.

15. The computer program as recited in claim 14, further executable to perform acts comprising initiating the new read or write data command if the number of free blocks is sufficient to store the read data for the pending read data requests and the write data for the new write data command.

16. The computer program as recited in claim 11, further executable to perform acts comprising:
storing the throttled new write data command and any subsequent new read or write data commands into a first-in-first-out (FIFO) read/write command request queue;
processing pending read data requests to completion to free up blocks in the buffer pool; and
executing a next read or write data command from the read/write command request queue if the number of free blocks becomes sufficient to store the read or write data for the next read or write data command.

17. A host bus adapter (HBA) comprising the computer program of claim 11, the HBA for implementing upper layer protocols (ULPs).

18. The HBA of claim 17, further comprising an Internet Small Computer System Interface (iSCSI) controller circuit.

19. A host computer comprising the HBA of claim 18.

20. A storage area network (SAN) comprising the host computer of claim 19, wherein an iSCSI network is coupled to the iSCSI controller circuit and one or more storage devices are coupled to the iSCSI network.

21. A method for avoiding read and write data congestion in a system for executing write and read data commands, the method comprising:
temporarily storing write data to be sent to a peer device and read data received from the peer device in a shared red/write buffer pool of blocks;
storing descriptor pointers to free blocks and blocks filled with read data in the shared read/write buffer pool in a receive list memory;
storing descriptor pointers to free blocks and blocks filled with write data in the shared read/write buffer pool in a transmit list memory; and
preventing an initiation of a new write data command until pending read data requests have been processed enough to free up sufficient blocks in the buffer pool to accommodate the data of the new write data command by
determining a number of blocks in the shared read/write buffer pool that will be required to store the read or write data for the pending read data requests and the new write data command, determining a number of free blocks in the shared read/write buffer pool, and throttling the new write data command if the number of free blocks in the shared read/write buffer pool is insufficient to store the read data for the pending read data requests and the write data for the new write data command.

22. The method as recited in claim 21, the system comprising a free list memory which contains descriptor pointers to free blocks not referenced in the receive list memory, the step of determining the number of free blocks in the buffer pool further comprising:

summing the number of free blocks in the receive list memory and the free list memory.

23. The method as recited in claim 21, further comprising initiating the new write data command if the number of free blocks is sufficient to store the read data for the pending read data requests and the write data for the new write data command.

24. The method as recited in claim 21, the system comprising a free list memory which contains descriptor pointers to free blocks not referenced in the receive list memory, the step of determining the number of free blocks in the buffer pool further comprising:

summing the number of free blocks in the receive list memory and the free list memory; and subtracting from the sum a number of blocks estimated for storing incoming read data for any pending read data requests.

25. The method as recited in claim 24, further comprising initiating the new read or write data command if the number of free blocks is sufficient to store the read data for the pending read data requests and the write data for the new write data command.

26. The method as recited in claim 21, further comprising:

storing the throttled new write data command and any subsequent new read or write data commands into a first-in-first-out (FIFO) read/write command request queue;

processing pending read data requests to completion to free up blocks in the buffer pool; and executing a next read or write data command from the read/write command request queue if the number of free blocks becomes sufficient to store the read or write data for the next read or write data command.

* * * * *